US007665444B2

(12) United States Patent
Marin et al.

(10) Patent No.: US 7,665,444 B2
(45) Date of Patent: Feb. 23, 2010

(54) APPARATUS SYSTEM AND METHOD FOR MEASURING A NORMALIZED AIR-TO-FUEL RATIO

(75) Inventors: Brett Marin, Slidell, LA (US); Alfred Schuppe, Columbus, IN (US)

(73) Assignee: Cummins Filtration IP, Inc, Minneapolis, MN (US)

( * ) Notice: Subject to any disclaimer, the term of this patent is extended or adjusted under 35 U.S.C. 154(b) by 310 days.

(21) Appl. No.: 11/384,740

(22) Filed: Mar. 20, 2006

(65) Prior Publication Data

US 2007/0214770 A1 Sep. 20, 2007

(51) Int. Cl.
*B01D 53/94* (2006.01)

(52) U.S. Cl. ........................................................ 123/494

(58) Field of Classification Search ................. 439/581, 439/551; 205/782, 424; 60/274, 276, 277, 60/297, 311; 123/494, 495, 406, 48, 519; *B01D 53/94; F02M 37/04, 51/00*

See application file for complete search history.

(56) References Cited

U.S. PATENT DOCUMENTS 6,663,424 B1 * 12/2003 Wyse et al. ................. 439/581
6,681,752 B1 * 1/2004 Kreikemeier et al. ....... 123/683
2006/0289314 A1 * 12/2006 Schnaibel et al. ........... 205/782
2007/0246358 A1 * 10/2007 Schneider et al. ........... 204/424

FOREIGN PATENT DOCUMENTS

DE 2328459 A * 1/1975

* cited by examiner

*Primary Examiner*—Stephen K Cronin
*Assistant Examiner*—Keith Coleman
(74) *Attorney, Agent, or Firm*—Kunzler Needham Massey & Thorpe

(57) ABSTRACT

An apparatus, system, and method are disclosed for measuring a normalized air-to-fuel ratio. A normalized air-to-fuel ratio is measured by providing an engine control module, providing a first wide-band oxygen sensor in fluid communication with an exhaust stream, adjusting the oxygen pumping current to achieve a stoichiometric balance, detecting the oxygen pumping current, converting the oxygen pumping current to an oxygen balance metric, and communicating the oxygen balance metric to the engine control module. In certain embodiments, the oxygen balance metric may be a volumetric oxygen percentage. In some embodiments, the present invention includes a first and second wide-band oxygen sensor upstream and downstream from an exhaust treatment module.

21 Claims, 4 Drawing Sheets

APPARATUS SYSTEM AND METHOD FOR MEASURING A NORMALIZED AIR-TO-FUEL RATIO

BACKGROUND OF THE INVENTION

1. Field of the Invention

This invention relates to exhaust systems and more particularly relates to measuring air-to-fuel ratios in an exhaust aftertreatment system.

2. Description of the Related Art

Engine performance and exhaust aftertreatment system performance are becoming increasingly important under a growing demand for safe, reliable, and environmentally friendly transportation. One effective and pervasive means for evaluating the performance of these systems is to derive data from engine exhaust. More specifically, an effective means of evaluating the performance of these systems is to measure the oxygen content in exhaust, and derive performance data therefrom, such as the current air-to-fuel ratio.

FIG. 1 is a block diagram of a currently available engine exhaust system 100. The depicted system 100 includes an exhaust stream 110, wide-band oxygen sensor 120, and engine control module (ECM) 130. The wide-band oxygen sensor 120 receives a sample of the exhaust stream 110. The sensor control circuitry, contained in the engine as control module, provides an oxygen pumping current to reach and maintain a stoichiometric balance condition within a reference chamber of the wide-band oxygen sensor (the reference chamber or cell is sometimes referred to as a Nernst cell). The engine control module sources and measures the oxygen pumping current. The measured current is used to calculate the engine's air-to-fuel ratio. Accordingly, the system 100 provides a means of determining an engine's air-to-fuel ratio by measuring the oxygen content of the exhaust.

Though the system 100 enables the engine control module to calculate the air-to-fuel ratio, the system 100 includes several deficiencies. For example, the engine control module may only function with a certain type or model of sensor because each sensor type or model presents the pumping current in a different manner or according to different constraints. Accordingly, substituting the sensor with a different sensor model or type would require the engine control module to be reconfigured according to the new sensor. This can be exceptionally problematic as other engine sensors and systems are likely to depend upon a specific ECM. Further, such a union between the engine control module and the sensor provides a disincentive to switch to less expensive, technically more effective, or otherwise superior sensor.

Additionally, the system 100 only provides for a single sensor, thereby foregoing significant functions. For example, having only one sensor does not enable the system to ascertain the effectiveness of related components such as a catalytic converter. Accordingly, enabling only a single sensor deprives the system of additional functionality.

From the foregoing discussion, it should be apparent that a need exists for a superior apparatus, system, and method that measure a normalized air-to-fuel ratio. Ideally, such an apparatus, system, and method would enable the engine control module to operate with multiple sensors regardless of sensory type, manufacturer, or model.

SUMMARY OF THE INVENTION

The present invention has been developed in response to the present state of the art, and in particular, in response to the problems and needs in the art that have not yet been fully solved by currently available solutions. Accordingly, the present invention has been developed to provide an apparatus, system, and method for measuring a normalized air-to-fuel ratio that overcome many or all of the above-discussed shortcomings in the art.

A system of the present invention includes an engine control module (ECM), a first wide-band oxygen sensor, and an oxygen sensor control module. The ECM manages all engine operation, including controlling engine combustion. The oxygen sensor control module functions to control the oxygen sensor heater, provide sensor cell biasing, signal conditioning and processing, sensor calibration, and data communication to and from the ECM. The first wide-band oxygen sensor is in fluid communication with an exhaust stream. The oxygen sensor control module establishes an oxygen pumping current for the wide-band oxygen sensor according to the oxygen content in the exhaust. The pumping current can be a positive value (for lean, or excess oxygen content), zero (for a stoichiometric exhaust condition), or a negative value (for rich, or an oxygen deficit). The oxygen sensor control module provides an oxygen balance metric to the ECM. Accordingly, the system provides the engine control module a standardized oxygen balance metric regardless of the sensor type or model.

The oxygen balance metric may correspond to a volumetric oxygen percentage. In certain embodiments, the oxygen balance metric may be a positive, zero, or a negative value. A positive oxygen balance metric corresponds to a volumetric excess, a zero oxygen balance metric corresponds to a volumetric equilibrium (no oxygen pumping into or out of the stoichiometric reference chamber), and a negative oxygen balance metric corresponds to a volumetric deficit. The engine control module may normalize the volumetric oxygen percentage to determine a molar oxygen percentage and subsequently the air-to-fuel ratio. In certain embodiments, the system includes a first and second wide-band oxygen sensor positioned upstream and downstream from a catalytic converter. The system may determine the volumetric oxygen percentage from each sensor and thereby determine the effectiveness of the catalytic converter and facilitate refreshing the catalytic converter by altering the engine combustion to produce exhaust with a low oxygen content.

The apparatus for measuring a normalized air-to-fuel ratio is provided with a logic unit containing a plurality of modules configured to functionally execute the necessary steps of measuring a normalized air-to-fuel ratio. These modules in the described embodiments include a sensor interface module matched to a first wide-band oxygen sensor and capable of detecting an oxygen pumping current therefrom, a balance estimation module configured to convert the oxygen pumping current to an oxygen balance metric, and a communication module that provides the oxygen balance metric to an ECM. In certain embodiments the sensor interface module is matched to a first and second wide-band oxygen sensor positioned upstream and down stream from an exhaust treatment module.

A method of the present invention is also presented for measuring a normalized air-to-fuel ratio. The method in the disclosed embodiments substantially includes the steps necessary to carry out the functions presented above with respect to the operation of the described system and apparatus. In one embodiment, the method includes providing an ECM, providing a first wide-band oxygen sensor in fluid communication with an exhaust stream, providing sensor circuitry that provides an oxygen pumping current to reach and maintain a stoichiometric balance condition within the reference chamber of the wide-band oxygen sensor, detecting the oxygen pumping current, converting the oxygen pumping current to an oxygen balance metric, and communicating the oxygen balance metric to the engine control module. In certain embodiments the method may include providing a second wide-band oxygen sensor positioned upstream and down stream from an exhaust treatment module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
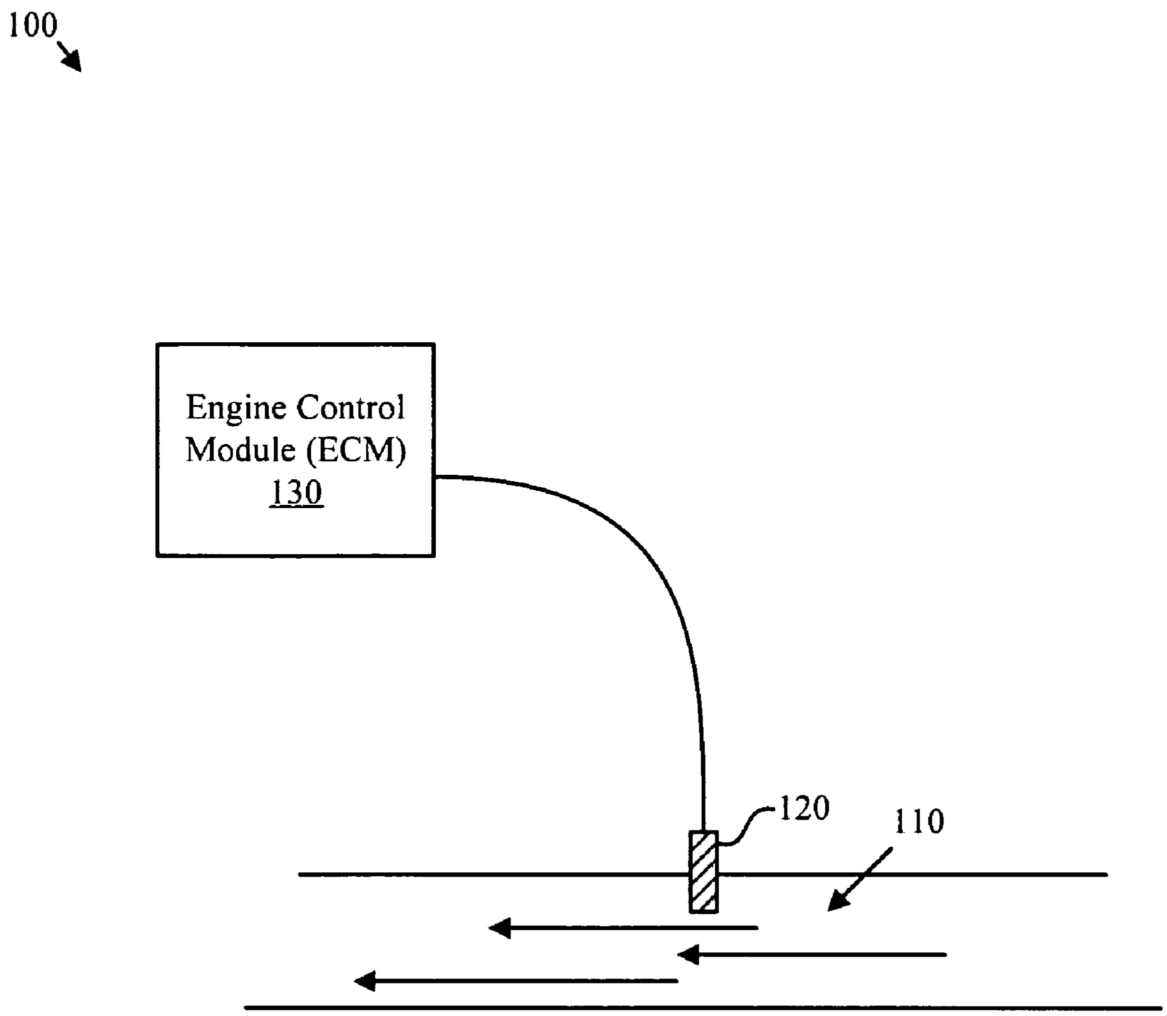
FIG. 1 is a schematic block diagram of a prior art system.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
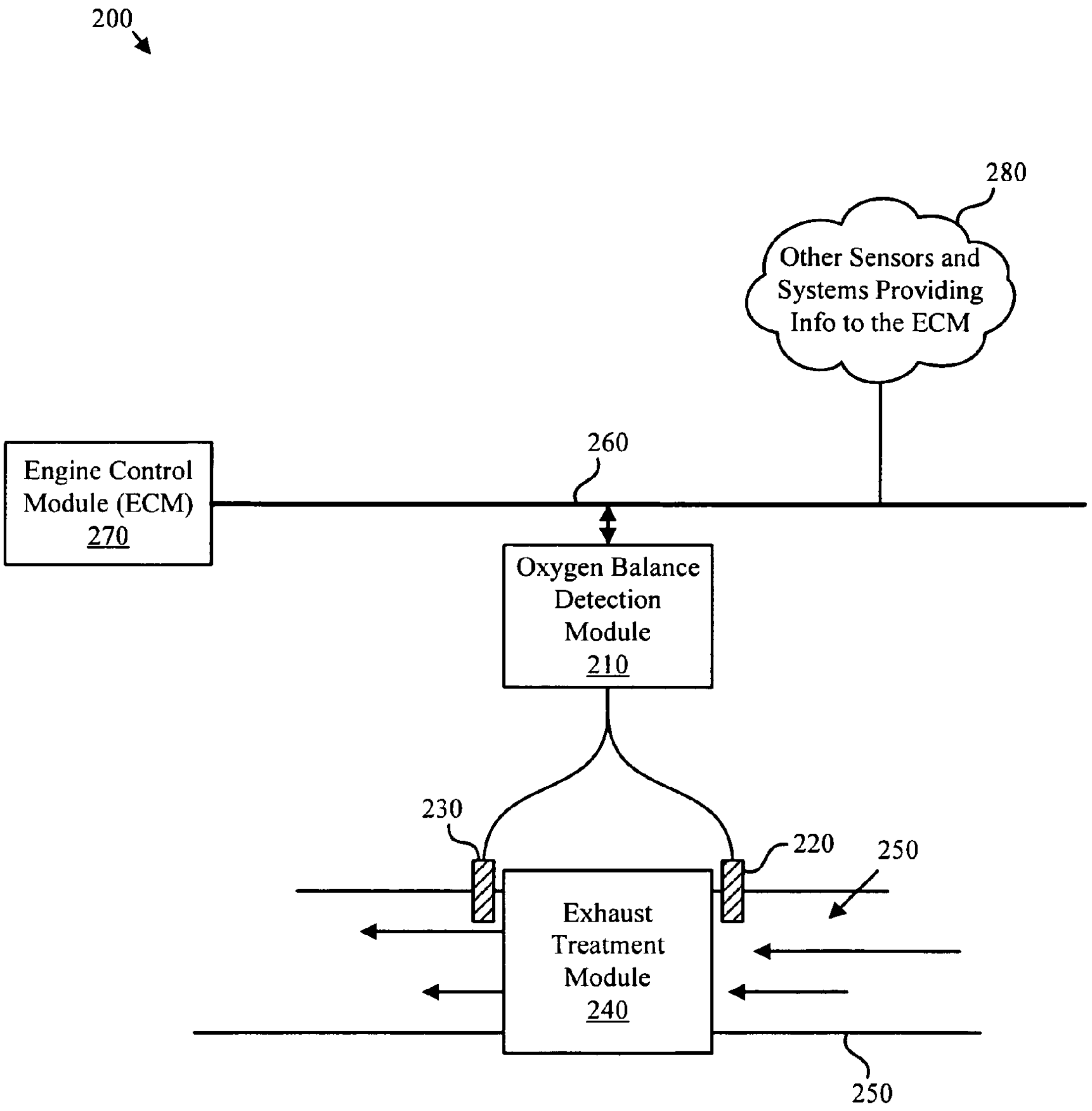
FIG. 2 is a schematic block diagram illustrating one embodiment of an air-to-fuel ratio measuring system in accordance with the present invention.

FIG. 2 is a schematic block diagram illustrating an air-to-fuel ratio measuring system 200 of the present invention. The depicted system 200 includes an oxygen sensor control module 210, a first wide-band oxygen sensor 220, a second wide-band oxygen sensor 230, a catalytic converter 240, an exhaust stream 250, a data link channel 260, an engine control module 270, and other sensors and systems 280. The various components of the system 200 function cooperatively to measure a normalized air-to-fuel ratio and present a standardized oxygen balancing metric to the engine control module 270.

The oxygen sensor control module 210 is matched to the first and second wide-band oxygen sensors 220, 230. In certain embodiments, the oxygen sensor control module 210 is matched to a particular sensor, sensor type, or sensor model, such that the detection module 210 may not function properly if one sensor type is substituted for another. In other embodiments, the oxygen sensor control module 210 includes a programmable detection unit capable of detecting and matching with various sensor types or models. In yet other embodiments, the oxygen detection module 210 is field replaceable, enabling short-notice replacement procedures and minimizing the downtime required to substitute a current detection module 210 for another. Accordingly, the oxygen detection module 210 may be sensor specific, programmable, or field replaceable.

The oxygen sensor control module 210 establishes an oxygen pumping current with the matched wide-band oxygen sensors 220, 230 in fluid communication with the exhaust stream 250. In certain embodiments, the sensors 220, 230 are substantially similar devices. The sensors 220, 230 are each able to detect an oxygen deficit or surplus in the exhaust stream, and accept an oxygen pumping current to eliminate the oxygen deficit or surplus.

One example of a sensor is a device that operates on a batch basis. Such a sensor may include an oxygen pump, storage chamber, and stoichiometric reader. In certain embodiments, the sensor technology includes a heated zirconium laminated substrate utilizing diffusion limited oxygen pumping. When the sensor is exposed to the exhaust stream 250 the storage chamber receives exhaust. The oxygen pump then either pumps oxygen in or out of the storage chamber until stoichiometric conditions are created therein. The oxygen pump is powered by an electrical current that is detected and measured by the oxygen sensor control module 210 and used to determine the oxygen balance metric.

Another example of a sensor may include a device that operates on a flow-rate basis. A flow-rate based sensor may include a flow channel connecting an upstream oxygen pump and a downstream stoichiometric reader. When the sensor is exposed to the exhaust stream 250 some of the exhaust flows past the upstream oxygen pump, through the flow channel, past the stoichiometric reader, and back into the exhaust stream 250.

The upstream oxygen pump introduces oxygen into the flow channel at varying rates until stoichiometric conditions are detected by the downstream stoichiometric reader. Similar to the above sensor operating on a batch basis, the upstream oxygen pump is powered by a measurable electrical current that is detected by the oxygen sensor control module 210 and used to determine the oxygen balance metric. The batch and flow-rate based sensors are only two examples of many possible sensor types or models that may be employed within the scope of the present invention.

In certain embodiments, the oxygen sensor control module 210 is in communication with the sensors 220, 230, but is otherwise physically separate from the sensors 220, 230. Separating the oxygen sensor control module 210 and the sensors 220, 230 ensures the more sensitive circuitry of the oxygen sensor control module 210 will not be harmed or otherwise made ineffective due to exhaust heat. In certain embodiments, the oxygen sensor control module 210 may be incorporated into a heat resistant sensor, thereby minimizing the total number of system components and simultaneously protecting the sensitive circuitry of the oxygen sensor control module 210.

The depicted system 200 also includes an exhaust treatment module 240 for treating an untreated exhaust stream provided by an engine and thereby provide a treated exhaust stream. The exhaust treatment module 240 may be a catalytic converter. A catalytic converter may be any air pollution abatement device that removes pollutants from exhaust, by such means as oxidizing the pollutants into carbon dioxide and water or reducing them to nitrogen. In certain embodiments, the exhaust treatment module 240 is a NOx adsorber or absorber. The depicted system 200 includes a first wide-band oxygen sensor 220 positioned upstream from the exhaust treatment module 240 and a second wide-band oxygen sensor 230 positioned downstream from the exhaust treatment module 240.

Positioned accordingly, the system 200 may determine the reduction capacity of the catalytic converter 240. More specifically, the system 200 may determine the molar oxygen percentage of the pre-converter exhaust using the first sensor 220, determine the molar oxygen percentage of the after-converter exhaust using the second sensor 230, and compare the two molar oxygen percentages to evaluate the reduction capacity of the catalytic converter 240. Such an evaluation is particularly useful in determining when to replenish the oxygen storage capacity of a NOx adsorber or absorber. Replenishing the oxygen storage capacity may include, for example, altering engine combustion via the engine control module to produce exhaust with a low oxygen content.

The oxygen sensor control module 210 also provides an oxygen balance metric to the engine control module 270. In embodiments with two or more wide-band oxygen sensors, the oxygen sensor control module 210 may simultaneously provide an oxygen balance metric for each wide-band oxygen sensor. In certain embodiments, the oxygen balance metric may be a positive or negative value corresponding to a volumetric excess or deficit of oxygen in the exhaust stream 250. In other words, the oxygen balance metric may correspond to a volumetric oxygen percentage.

In embodiments wherein the exhaust stream 250 contains a volumetric excess of oxygen, the oxygen balance metric is a positive value. Conversely, in embodiments wherein the exhaust stream 250 contains a volumetric deficit of oxygen, the oxygen balance metric will be a negative value. For example, if a sample of exhaust stream included 80% more oxygen than is required to reach stoichiometric conditions, then the oxygen balance metric would represent the oxygen surplus as +80% or +0.8.

In some embodiments, converting the measurable electrical current to an oxygen balance metric may include converting a non-linear function representing the electrical current to a linear function representing the volumetric oxygen percentage. In other embodiments, the electrical current is not represented by a non-linear function, eliminating the need for a non-linear to linear conversion. Accordingly, the oxygen sensor control module 210 provides the engine control module a standardized oxygen metric regardless of the sensor model or type.

In certain embodiments, providing the oxygen balance metric includes communicating the oxygen balance metric over a data link channel 260. The data link channel 260 may include any data communications transmission path between the oxygen balance metric and the ECM. In certain embodiments, the data link channel 260 includes intermediate switching nodes as required by the particular system. Providing a volumetric oxygen percentage to the engine control module 270 may be superior to providing a normalized air-to-fuel ratio, because the oxygen sensor control module 210 may not have the system pressure data necessary to convert the volumetric oxygen percentage to a molar oxygen percentage.

Figure 3:
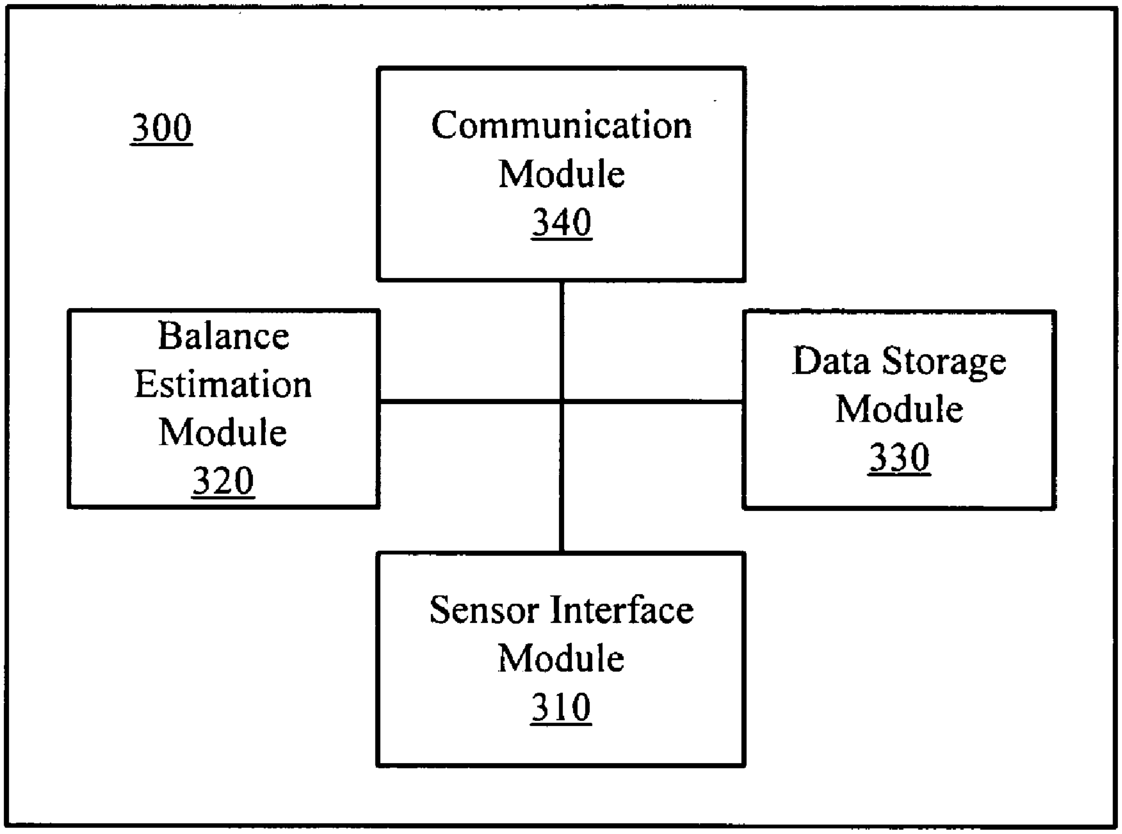
FIG. 3 is a schematic block diagram illustrating one embodiment of an air-to-fuel ratio measuring apparatus in accordance with the present invention.

FIG. 3 is a schematic block diagram of sensor control module 300. The depicted sensor control module 300 includes a sensor interface module 310, a balance estimation module 320, a data storage module 330, a communication module 340, a data link channel 350, and a pumping current channel 360. The components of the apparatus 300 function cooperatively to produce a standardized oxygen balance metric that may be used to determine volumetric oxygen balance metric.

The sensor interface module 310 is matched to a wide-band oxygen sensor in fluid communication with an exhaust stream. In certain embodiments, matching the sensor interface module 310 with a wide-band oxygen sensor may include matching the sensor interface module 310 to a particular sensor model or type. As will be further detailed below, in other embodiments, the sensor interface module may include a programmable detection unit capable of detecting and matching with various sensor types or models.

In certain embodiments, the sensor interface module 310 is matched to two wide-band oxygen sensors substantially identical to one another. In such embodiments, the first and second wide-band oxygen sensors may be in fluid communication with untreated and treated exhaust streams respectively. More specifically, the first wide-band oxygen sensor may be upstream from a catalytic converter and the second wide-band oxygen sensor is down stream from the catalytic converter (see FIG. 2). The sensors each detect an oxygen deficit or surplus in the exhaust stream, and accept an oxygen pumping current to eliminate the oxygen deficit or surplus. Providing two sensors enables a means of the converter's effectiveness by measuring the oxygen content upstream and downstream from the exhaust treatment module.

The data storage module 330 may include machine readable instructions or program codes that enable the apparatus 300 to identify and communicate with various sensor types or models. The data storage module 330 may include both volatile and nonvolatile memory. Accordingly, the data storage module 330 may include volatile memory such as RAM (Random Access Memory), typically used to hold variable data, stack data, executable instructions, and the like. Further the data storage module 330 may include nonvolatile memory such as, but not limited to, EEPROM (Electrically Erasable Programmable Read Only Memory), flash PROM (Programmable Read Only Memory), battery backup-RAM, and hard disk drives. Enabling the sensor control module 300 to function with various sensor types and models minimizes the downtime required to either replace sensors or the sensor control module 300 itself.

The sensor interface module 310 measures an oxygen pumping current from a wide-band oxygen sensor. In certain embodiments, the sensor interface module 310 measures the oxygen pumping current and communicates the measured current to the balance estimation module 320. In other embodiments, the sensor interface module 310 functions as a communication interface that allows the balance estimation module 320 to measure the oxygen pumping current. In such embodiments, the sensor interface module may include serial interfaces such as RS-232, USB (Universal Serial Bus), SCSI (Small Computer Systems Interface), etc.

The balance estimation module 320 converts an oxygen pumping current to an oxygen balance metric. In certain embodiments, the oxygen balance metric represents the volumetric percentage of oxygen in the exhaust stream. A positive oxygen balance metric may correspond to a volumetric excess, while a negative oxygen balance metric may correspond to a volumetric deficit. For example, if a sample of exhaust stream required injection of 80% of the oxygen required for stoichiometric conditions, then the oxygen balance metric would represent the oxygen deficit as −80% or −0.8.

The communication module 340 provides an oxygen balance metric to an ECM. In certain embodiments, the communication module 340 receives the oxygen balance metric from the balance estimation module 320 and relays the oxygen balance metric to the ECM. In other embodiments, the communication module 340 functions as an interface that allows the balance estimation module 320 to communicate the ECM. In such embodiments, the communication module may include serial interfaces such as RS-232, USB (Universal Serial Bus), SCSI (Small Computer Systems Interface), etc.

The engine control module may convert the oxygen balance metric from volumetric percentage of oxygen to molar percentage of oxygen by accounting for system pressure. The engine control module may obtain the system pressure, from other sensors and system in communication therewith. Accordingly, the apparatus 300 provides the engine control module a standardized value (an oxygen balance metric) from multiple wide-band oxygen sensors regardless of the sensor model or type.

The schematic flow chart diagram that follows is generally set forth as logical flow chart diagram. As such, the depicted order and labeled operations are indicative of one embodiment of the presented method. Other steps and methods may be conceived that are equivalent in function, logic, or effect to one or more operations, or portions thereof, of the illustrated method. Additionally, the order in which a particular method occurs may or may not strictly adhere to the order of the corresponding operations shown.

Figure 4:
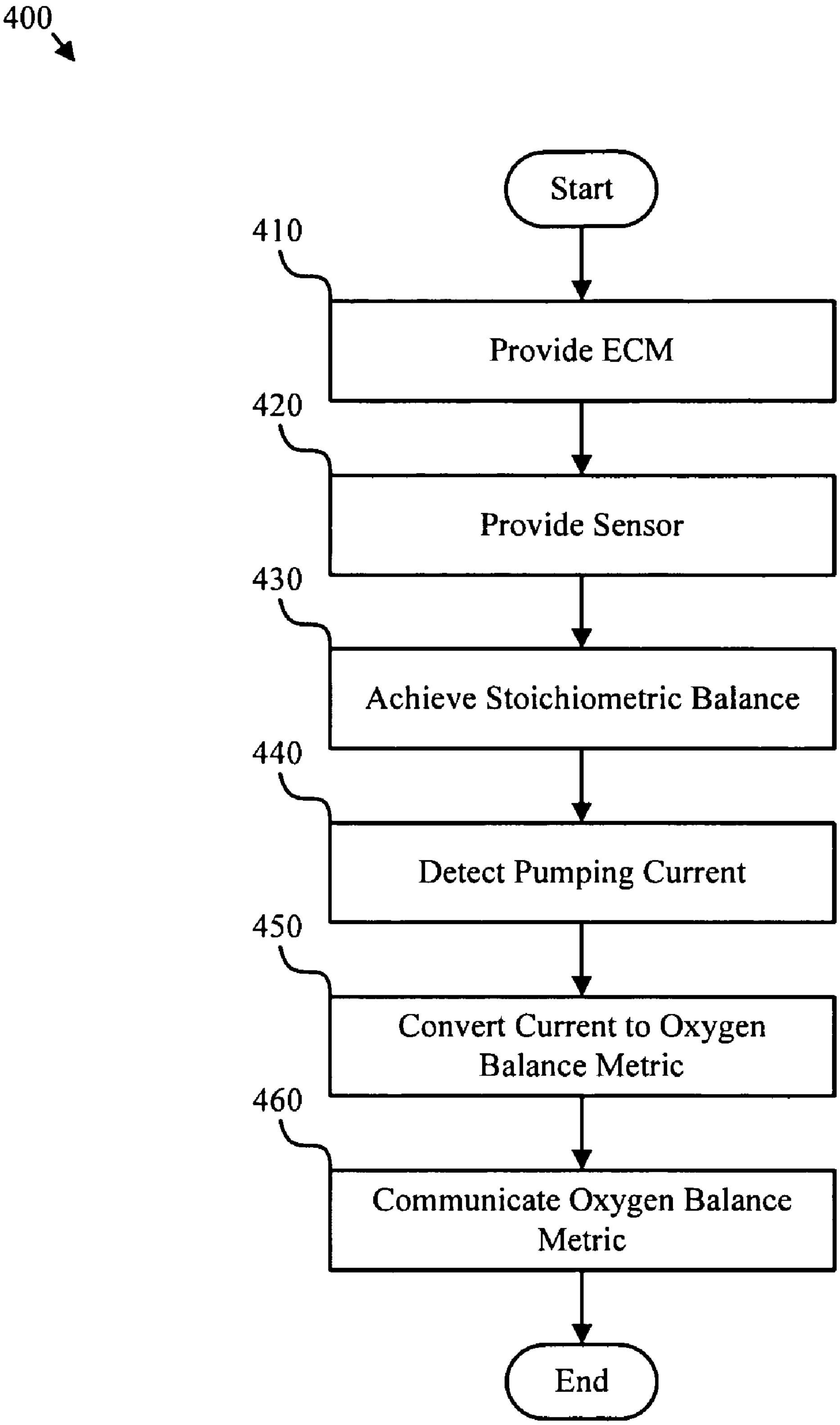
FIG. 4 is a schematic flow chart diagram illustrating one embodiment of a method for measuring air-to-fuel ratio in accordance with the present invention.

FIG. 4 is a schematic flow chart diagram illustrating a method for measuring air-to-fuel ratio. The depicted method 400 includes the operations of providing 410 an engine control module, providing 420 a sensor, achieving 430 a stoichiometric balance with the sensor, detecting 440 the sensor pumping current, converting 450 the pumping current to an oxygen balance metric, and communicating 460 the oxygen balance metric to the engine control module. The various steps of the depicted method illustrate a means for measuring a normalized air-to-fuel ratio.

Providing 410 an engine control module may include providing an engine control module that controls engine combustion. The engine control module may function harmoniously with vehicle sensors and other engine control devices to insure that the engine operates at maximum efficiency and performance. The engine control module may receive electronic signals from engine sensors, analyze the data, and make an engine performance decision based on the pre-set parameters. The engine control module may also send an output command to an actuator that adjusts engine performance that may include adjusting engine combustion. Data received by the engine control module may include system pressure data that may be used to normalize the oxygen balancing metric received by the engine control module.

Providing 420 a sensor includes providing a first wide-band oxygen sensor in fluid communication with an exhaust stream. In certain embodiments, providing 420 a sensor includes providing a first and second wide-band oxygen sensor that are each able to detect an oxygen surplus or deficit in the exhaust stream, and accept an oxygen pumping current to eliminate the oxygen surplus or deficit. In certain embodiments, the first sensor is upstream from an exhaust treatment model and the second sensor is downstream from the exhaust treatment module. Positioning the sensors accordingly, provides a means of ascertaining the effectiveness of the exhaust treatment module. Additionally, the sensors may include a variety of wide-band oxygen sensor types or models depending upon the needs of the system.

Achieving 430 a stoichiometric balance with the sensor may include adjusting the oxygen pumping current. The oxygen pumping current may be an electrical current used to pump oxygen into or out of an exhaust storage compartment within a wide-band oxygen sensor. The exhaust storage compartment may include a stoichiometric reader capable of identifying stoichiometric conditions within the storage compartment. Accordingly, achieving 430 a stoichiometric balance may include adjusting the oxygen pumping current to activate an oxygen pump until stoichiometric conditions are created within the sensor.

Detecting 440 the oxygen pumping current may include a sensor interface module detecting a sensors oxygen pumping current. In certain embodiments, detecting 440 may include a sensor interface module measuring the oxygen pumping current and transmitting the measurements to a balance estimation module. In other embodiments, detecting 440 may include a sensor interface module providing an interface for a balance estimation module to detect and measure the oxygen pumping current. In yet other embodiments, detecting 440 may include determining the type or model of wide-band oxygen sensor before measuring the oxygen pumping current.

Converting 450 the oxygen pumping current to an oxygen balance metric may include the balance estimation module converting a measured oxygen pumping current to an oxygen volumetric percentage. The oxygen volumetric percentage represents the percentage of oxygen molecules in a given volume of exhaust. In some embodiments, converting 450 the electrical current to a volumetric oxygen percentage may include converting a non-linear function representing the electrical current to a linear function representing the volumetric oxygen percentage. In other embodiments, the electrical current is not represented by a non-linear function, eliminating the need for a non-linear to linear conversion.

Communicating 460 the oxygen balance metric to the engine control module may include a communication module 340 enabling communication between the balance estimation module 310 and the engine control module 270. In certain embodiments, the balance metric is sent from the balance estimation module to the communication module, and the communication module sends the balance metric to the ECM. Additionally, in embodiments where in the oxygen balance metric is a volumetric percentage, the engine control module may adjust the volumetric according to system pressure and derive the molar percentage of oxygen. The molar percentage of oxygen could be used to determine air-to-fuel adjustments that could optimize engine performance or refresh the exhaust treatment module.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for measuring a normalized air-to-fuel ratio, the system comprising:

a first wide-band oxygen sensor in fluid communication with an exhaust stream generated by an internal combustion engine, the first wide-band oxygen sensor configured to detect an oxygen deficit in the exhaust stream;

the wide-band oxygen sensor further configured to detect an oxygen surplus in the exhaust stream;

at least one oxygen pump configured to pump oxygen into the wide-band oxygen sensor to eliminate a detected oxygen deficit and pump oxygen out of the wide-band oxygen sensor to eliminate a detected oxygen surplus, the at least one oxygen pump being powered by an electrical current; and an oxygen sensor control module matched to the wide-band oxygen sensor and configured to detect the electrical current and provide a volumetric oxygen percentage based on the detected electrical current to an engine control module of the engine, wherein the volumetric oxygen percentage is a positive value if the wide-band oxygen sensor detects one of an oxygen deficit and surplus in the exhaust stream and a negative value if the wide-band oxygen sensor detects the other of the oxygen deficit and surplus in the exhaust stream.

2. The system of claim 1, wherein the positive value corresponds to an oxygen surplus and the negative value corresponds to an oxygen deficit.

3. The system of claim 1, further comprising the engine control module, wherein the engine control module is configured to receive an exhaust pressure and normalize the volumetric oxygen percentage to a standard pressure.

4. The system of claim 1, wherein the oxygen sensor control module is field replaceable.

5. The system of claim 1, further comprising an exhaust treatment module configured to treat an untreated exhaust stream provided by an engine and thereby provide a treated exhaust stream.

6. The system of claim 5, further comprising a second wide-band oxygen sensor substantially identical to the first wide-band oxygen sensor.

7. The system of claim 6, wherein the first and second wide-band oxygen sensors are in fluid communication with the untreated and treated exhaust streams respectively.

8. An apparatus for measuring a normalized air-to-fuel ratio, the apparatus comprising:

a sensor interface module matched to a first wide-band oxygen sensor and configured to detect an electrical current associated with pumping oxygen into the first wide-band oxygen sensor and pumping oxygen out of the first wide-band oxygen sensor;

a balance estimation module configured to convert the detected electrical current to a standardized volumetric oxygen percentage having one of a negative value and a positive value; and a communication module configured to provide the standardized volumetric oxygen percentage to an engine control module, the standardized volumetric oxygen percentage being based on the detected electrical current.

9. The apparatus of claim 8, wherein a positive value corresponds to pumping oxygen out of the first wide-band oxygen sensor.

10. The apparatus of claim 8, wherein a negative value corresponds to pumping oxygen into the first wide-band oxygen sensor.

11. The apparatus of claim 8, the sensor interface module is matched to a second wide-band oxygen sensor substantially identical to the first wide-band oxygen sensor.

12. The apparatus of claim 11, wherein the first and second wide-band oxygen sensors are in fluid communication with the untreated and treated exhaust streams respectively.

13. A method for measuring a normalized air-to-fuel ratio, the method comprising:

providing an engine control module configured to control engine combustion;

providing a first wide-band oxygen sensor in fluid communication with an exhaust stream, the first wide-band oxygen sensor configured to detect an oxygen deficit in the exhaust stream and an oxygen surplus in the exhaust stream;

pumping oxygen into the first wide-band oxygen sensor using an oxygen pump if the first wide-band oxygen sensor detects an oxygen deficit and pumping oxygen out of the first wide-band oxygen sensor using the oxygen pump if the first wide-band oxygen sensor detects an oxygen surplus, wherein the amount of oxygen pumped into or out of the first wide-band oxygen sensor corresponds with an electrical current in power supply communication with the oxygen pump;

adjusting the electrical current to achieve a stoichiometric balance in the first wide-band oxygen sensor;

detecting the electrical current after the stoichiometric balance is achieved;

converting the electrical current to a volumetric oxygen percentage; and communicating the volumetric oxygen percentage to the engine control module.

14. The method of claim 13, wherein the volumetric oxygen percentage comprises positive and negative values.

15. The method of claim 14, wherein a positive value corresponds to a volumetric excess.

16. The method of claim 14, wherein a negative value corresponds to a volumetric deficit.

17. The method of claim 13, wherein the engine control module is further configured to receive an exhaust pressure and normalize the volumetric oxygen percentage to a standard pressure.

18. The method of claim 13, wherein the oxygen sensor control module is field replaceable.

19. The method of claim 13, further comprising treating an untreated exhaust stream provided by an engine and thereby providing a treated exhaust stream.

20. The method of claim 19, further comprising providing a second wide-band oxygen sensor substantially identical to the first wide-band oxygen sensor.

21. The method of claim 20, wherein the first and second wide-band oxygen sensors are in fluid communication with the untreated and treated exhaust streams respectively.

* * * * *